United States Patent [19]

Kamimura et al.

[11] 4,400,744
[45] Aug. 23, 1983

[54] CASSETTE TAPE PLAYER

[75] Inventors: Teturo Kamimura; Masahiro Komatsubara; Shizuo Ando; Takuzi Inanaga; Akira Takahashi, all of Kawagoe, Japan

[73] Assignee: Pioneer Electronic Corporation, Tokyo, Japan

[21] Appl. No.: 245,931

[22] Filed: Mar. 20, 1981

[30] Foreign Application Priority Data

Mar. 31, 1980 [JP] Japan .............................. 55-42676[U]

[51] Int. Cl.³ ...................... G11B 15/18; G11B 17/00; G11B 19/02
[52] U.S. Cl. ......................................... 360/69; 360/71
[58] Field of Search .................. 360/69, 71, 75, 74.4, 360/65, 66, 96, 92, 71; 242/198

[56] References Cited

U.S. PATENT DOCUMENTS

| | | | |
|---|---|---|---|
| 3,934,270 | 1/1976 | Iwata | 360/71 |
| 4,037,259 | 7/1977 | Hammon | 360/69 |
| 4,173,028 | 10/1979 | Hyodo | 360/69 |
| 4,328,520 | 5/1982 | Iwata | 360/74.4 |

Primary Examiner—Robert M. Kilgore
Attorney, Agent, or Firm—Armstrong, Nikaido, Marmelstein & Kubovcik

[57] ABSTRACT

A new tape player capable of playing a normal magnetic tape and a chrome tape. A selector lever is pivotally provided in the chassis. The lever has, at its one end, a bent probe portion. This bent probe portion is urged to come into engagement with a chrome tape indicating aperture to ensure that an electric circuit for a chrome tape is turned on.

4 Claims, 8 Drawing Figures

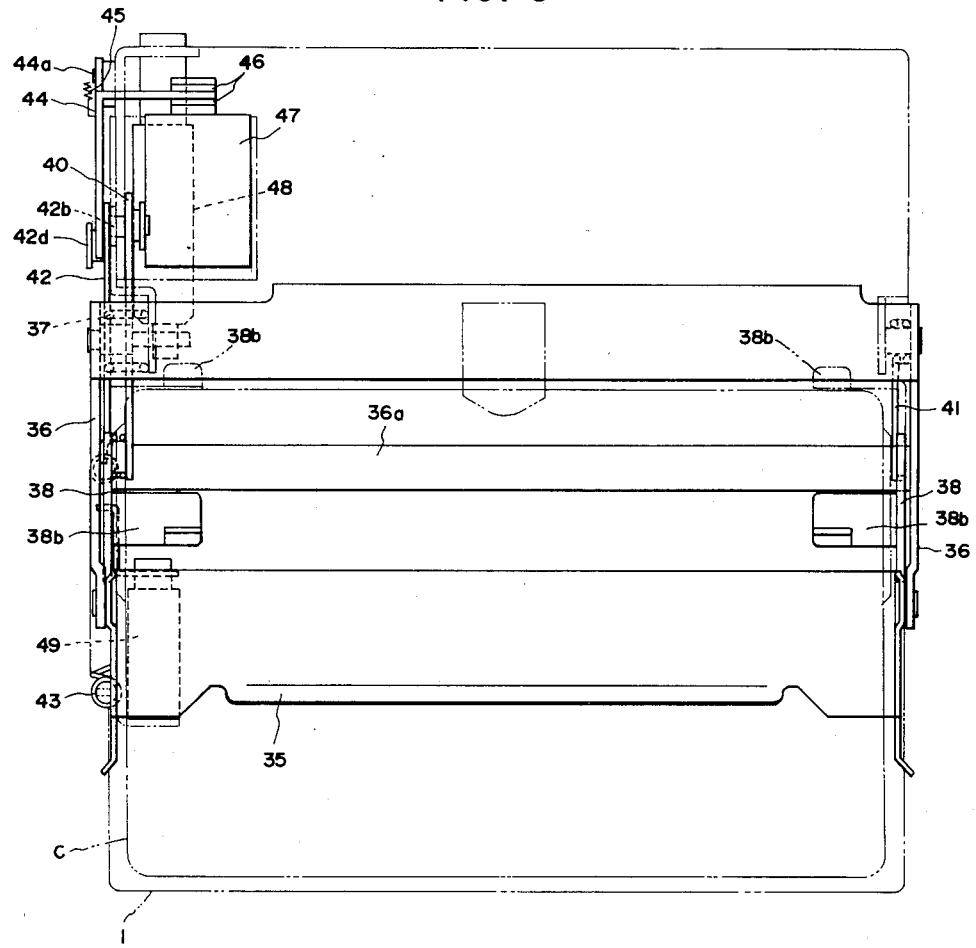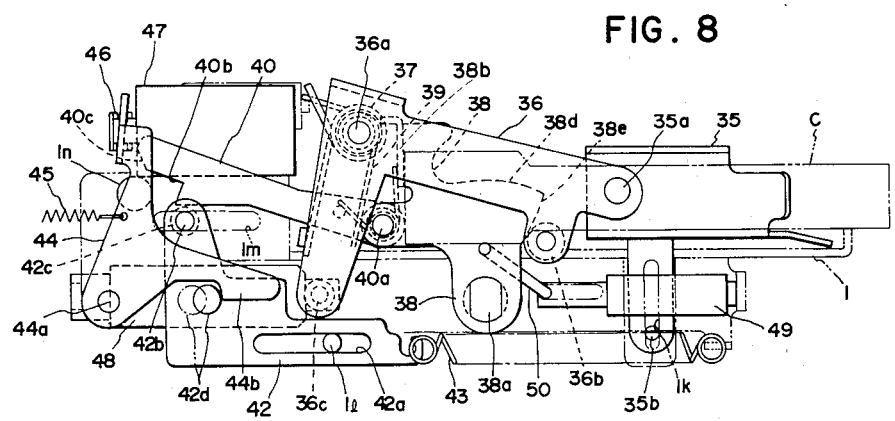

CASSETTE TAPE PLAYER

BACKGROUND OF THE INVENTION

The present invention relates generally to tape players and particularly to a cassette tape players of the type capable of playing a chrome-type as well as a normal magnetic tape.

There are available, in addition to normal magnetic tape cassette, chrome tape cassettes which can provide higher quality sound recording and reproduction than the normal type. Since they, the normal and chrome types, are best played under differently conditioned electrical requirements, tape players having means capable of selectively playing magnetic tapes of these both types must have certain sensor means responsive their differences to provide suitable electrical adjustment. For this purpose, a reliable tape player in which the necessarily adjusted equalized and biased electrical circuits for the chrome-type and normal tape are equipped and operable in a simple way has to be developed.

SUMMARY OF THE INVENTION

Therefore, the principal object of the present invention is to provide such tape type sensing means which is accurately responding to the chrome tape probing projection located adjacent to the erasure protection flap of a chrome tape cassette for connection to complete the predetermined electrical circuit for recordings or reproducings thereof.

In order to achieve the above object, there is essentially provided a cassette tape player comprising a chassis; a head base adapted to take a retracted position and an advanced position relative to a loaded cassette; probe means for detecting a chrome tape indicating aperture formed in said loaded cassette, said probe means being normally urged into engagement with said aperture; control means for holding said probe means out of engagement with aperture while said head base takes the retracted position; and switch means for turning on an electric circuit for a chrome tape by the probe means being urged into engagement with the chrome coated tape indicating aperture.

BRIEF DESCRIPTION OF THE DRAWINGS

FIG. 6 is a plan view of the mechanism of FIG. 5;

FIG. 8 is a side view of the mechanism in the cassette-load position.

DETAILED DESCRIPTION OF THE PREFERRED EMBODIMENTS

The preferred embodiment of the present invention will now be described in conjunction with the accompanying drawings.

Figure 1:
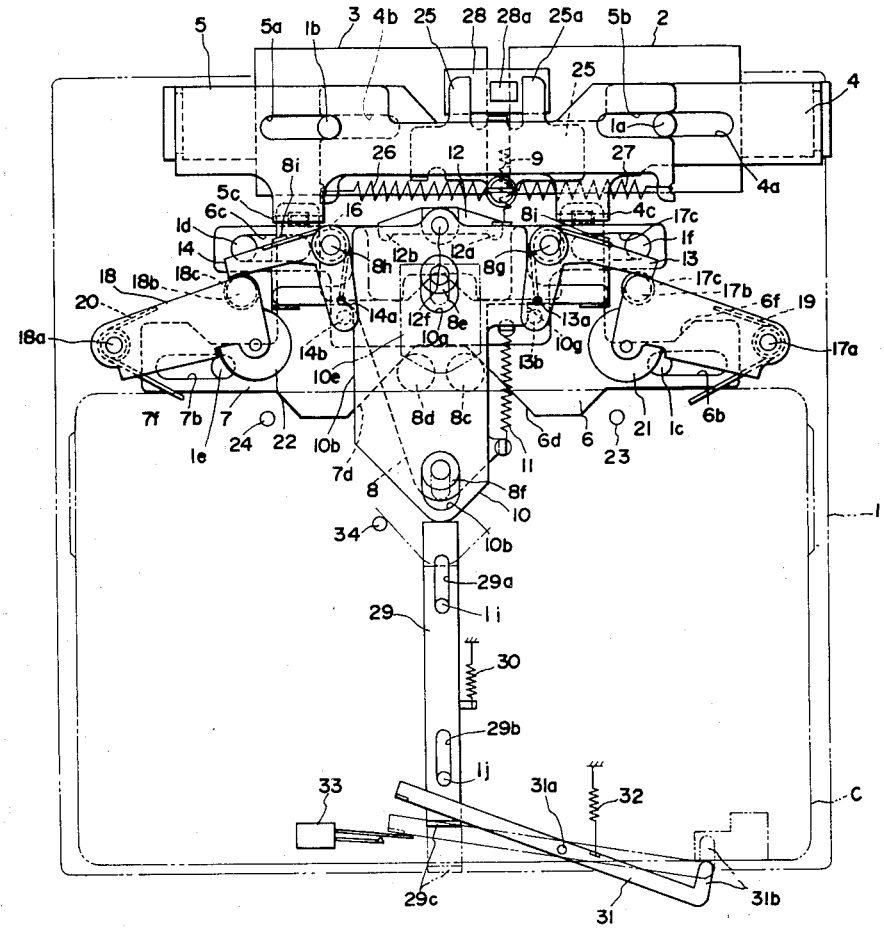
FIG. 1 is a plan view of the tape player of this invention in a non-operating position.
Figure 2:
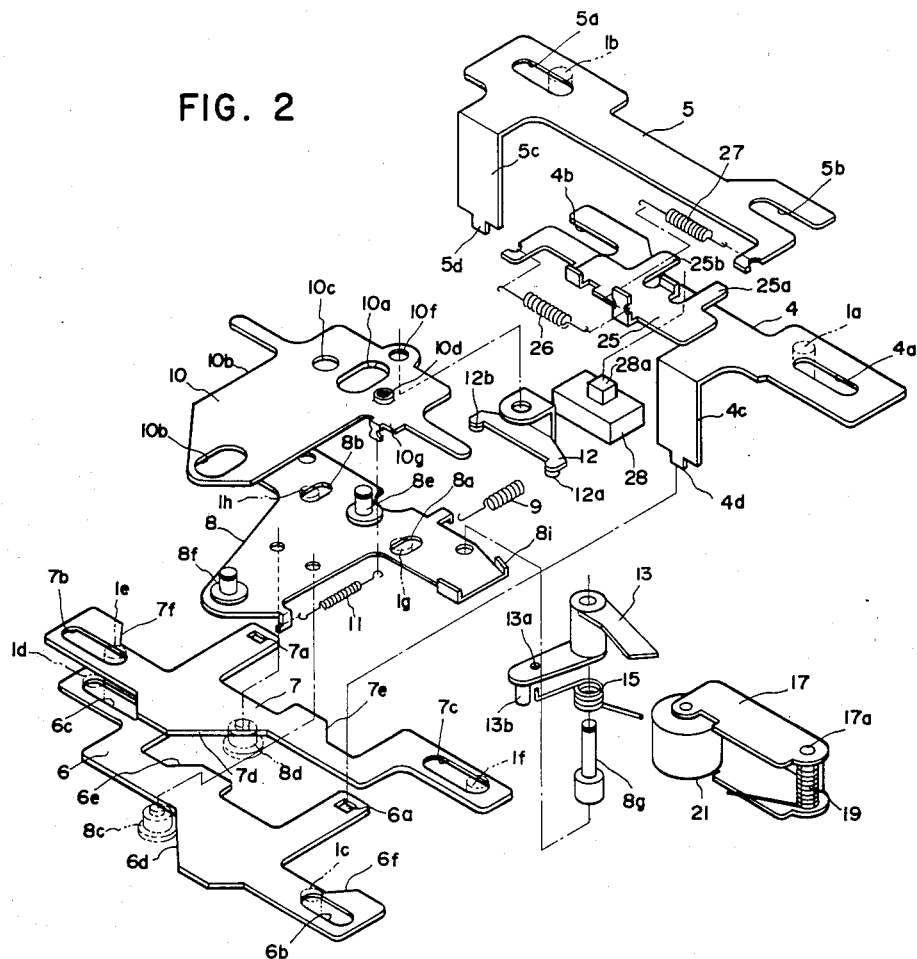
FIG. 2 is an exploded perspective view illustrating the construction of the tape player of FIG. 1.
Figure 7:
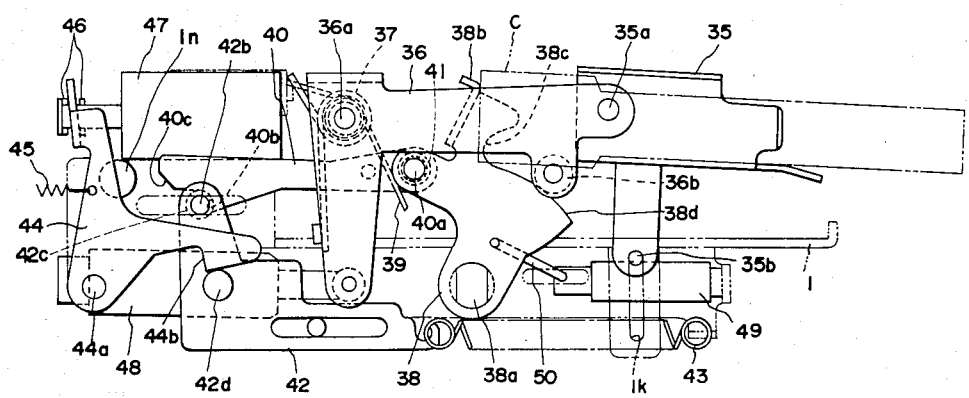
FIG. 7 is a side view of the cassette loading and unloading mechanism in an intermediate position with respect to the cassette-eject position.

Referring first to FIGS. 1 and 2 of the drawings, the numeral 1 generally designates a chassis of the tape player constructed in accordance with the present invention in which a pair of plungers 2 and 3 are mounted at the rear end (or upper end in FIG. 1) of the chassis. Connected to the plungers 2 and 3, respectively, there are side plates 4 and 5 of opposite and symmetrical shape with respect to each other. Each of the slide plates 4 and 5 has a pair of axially elongated slots 4a, 4b and 5a and 5b therein in which corresponding pins 1a and 1b rigidly fixed to the chassis 1 protrude whereby the sidewise sliding movements of the slide plates 4 and 5, actuated by the plungers 2 and 3 are correctly guided. In addition, the slide plates 4 and 5 are provided with vertical flaps 4c and 5c each having at their lower end engaging tongues 4d and 5d, respectively.

The numerals 6 and 7 indicate slide cam plates of opposite configuration that are arranged in the chassis to take a symmetrical form with respect to each other and having holes 6a and 7a to engage the engaging tongues 4d and 5d, respectively. Also, the slide cam plates 6 and 7 respectively have a pair of axially elongated slots 6b, 6c and 7b, 7c in which corresponding pins 1c, 1d, 1e, and 1f rigidly fixed to the chassis 1 protrude. Thus, as in operation the slide cam plates 6 and 7 slide sideway, these pins in conjunction with the elongated cam plate slots serve to correctly guide their sliding movement. Directly above the slide cam plates 6 and 7 there is parallelly disposed a head base actuating plate 8 including a pair of holes 8a and 8b to receive therein the attaching screws for attaching a head 10e to a head base 10 that is mounted above the actuating plate. A tension spring 9 is mounted on and has its one end secured to the chassis while other end engaged with the actuating plate 8 to urge it in the rearward (or upward in FIG. 1) direction. Upon the underside of the actuating plate 8 there are mounted a pair of rollers 8c and 8d for rotation in contact with head base advancing cam surfaces 6d and 7d formed in the slide cam plates 6 and 7, respectively. In addition, actuating plate 8 is provided with a pair of pins 8e and 8f on its upper surface that are disposed to protrude in corresponding elongated slots 10a and 10b formed in the head base 10. Thus, similarly, during the relative movement of the actuating plate 8 to the head base 10, the pins serve as a guide for such movement associated with the elongated head base slots. Also, the actuating plate 8 has its both pins 8e and 8f axially extended downwardly through its cross section into elongated slots, not shown, bored out in the chassis 1 in such a manner that, as the actuating plate 8 slides in the back-and-forth direction (top-to-bottom direction in FIG. 1) relative to the chassis 1, the elongated chassis slots serve to guide its sliding movement in conjuction with the downwardly extending actuating plate pins. A tension spring 11 is provided connected between the head base 10 and the actuating plate 8 to pull one against the other. In addition, the head base 10 includes a pair of mounting holes 10c and 10d to permit mounting of the head 10e.

At a rear end portion of the head base 10 there is mounted a symmetrical swing arm 12 adapted for pivot about an axis 10f and having a pair of pins 12a and 12b that are adapted to oscillate into abutting relationship with head base retracting cam surfaces 6e and 7e of the slide cam plates 6 and 7.

The numerals 13 and 14 indicate push levers that are pivotably mounted on their respective pivots 8g and 8h at either side of the actuating plate 8. In addition, on the arm shafts 8g and 8h are positioned torsion springs 15 and 16, respectively. The torsion springs 15 and 16 have, at one end, their respective straight portions engaged with corresponding lugs 8i and 8j of the actuating plate 8 and, at opposite end, their respective bent portions engaged with engaging holes 13a and 14a of the push lever 13 and 14 in such a manner that the torsion spring 15 serves to urge the push arm 13 to rotate in a clockwise direction while the torsion spring 16 serves to urge the push lever 14 to rotate in a counter-clockwise direction.

In the chassis 1 there are mounted a pair of pinch roller holders 17 and 18 pivotally disposed on stationary pivots 17a and 18a rotatably attached to the chassis 1. The pinch roller holders are respectively provided with torsion springs 19 and 20 in such a manner that the pinch roller holder 17 is urged to pivot in a clockwise direction, thereby urging a pinch roller 21 to rotate away from a capstan 23 while the pinch roller holder 18 is urged to pivot in a counter-clockwise direction, thereby urging a pinch roller 22 to rotate away from a capstan 24. It is to be noted that, since it is so designed that each of the torsion springs 15 and 16 of the push levers 13 and 14 have more strength than each of the torsion springs 19 and 20, the push levers are compelled to act to press, at their ends, against the pinch roller holders 17 and 18 pivotting on their respective pins 17b and 18b by the forces of the torsion springs 15 and 16, respectively so that the pinch rollers 21 and 22 are both normally prevented from rotation in the opposite direction to their corresponding capstans 23 and 24.

Also, the push levers 13 and 14 are provided with pins 13b and 14b, respectively, which abut against corresponding edges 10g and 10h of the head base 10a thus preventing the push lever 13 from clockwisely directional rotation and the push arm 14 from counter-clockwisely directional rotation.

Directly beneath and extending downwardly from the pinch roller holder pins 17b and 18b there are mounted rollers 17c and 18c for rotation in contact with oblique cam surfaces 6f and 7f, respectively, of the slide cam plates 6 and 7.

A switch plate 25 is provided interposed between the slide plates 4 and 5, and is also connected through a tension spring 26 with the slide plate 4 and through another tension spring 27 with the slide plate 5. Tension springs 26 and 27 are of equal strength to each other. From the switch plate 25 project backwardly in the same plane a pair of spaced switch elements 25a and 25b between which a contact element 28a of a contact block 28 protrudes.

Referring still to FIG. 1, there is shown an interlocking bar 29 having a pair of longitudinally extending elongated slots 29a and 29b therein in which pins 1i and 1j fixed to the chassis 1 correspondingly protrude. Thus, as the interlocking arm slide longitudinally, the elongated slots guide its sliding motion in association with the pins. Also, the interlocking bar 29 is urged by the force of a tension spring 30 in the rearward direction to permit abutment against the forward end of the actuating plate 8. A cassette tape selector lever 31 is provided mounted pivotally on a pivot 31a rigidly fixed to the chassis 1, and is urged to rotate in a counter-clockwise direction by the force of a tension spring 32. The straight end of the selector lever 31 intersects the interlocking bar 29 to ensure an engagement with a bent portion 29c formed thereon. The selector lever 31 is also provided at its bent opposite end a probe element 31b which, while the head base takes the advanced position to play a chrome tape, is urged and positioned home in its indicator aperture to close a suitable switch 33 associated with the necessary equalizer and bias adjustment for the chrome tape.

In addition, the probe element as mentioned above may be applicable for use as a detector for the erase protection flaps of the cassettes to prevent careless erasure.

In front of the head base 10 situated is a stopper 34 for placing a limit against the advance movement of the head base, thus permitting proper contact of the tape head 10e against the tape face.

Figure 5:
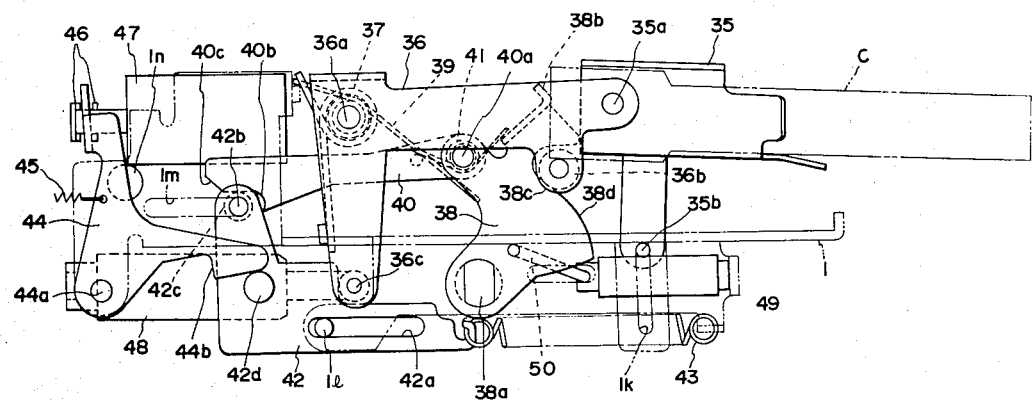
FIG. 5 is a side view of the cassette loading and unloading mechanism in the cassette tape unload-position of the present invention.

Referring now to FIGS. 5 and 6, the cassette loading and ejecting mechanisms of this embodiment will be described in accordance with the present invention. In the drawing the numeral 35 generally designates a cassette holder for receiving a cassette C inserted from outside the chassis. The numeral 36 generally indicates a cassette holder positioning lever that is rotatably disposed on a pivot 36a and is normally urged by the force of a torsion spring 37 to rotate in a clockwise direction. Additionally, the positioning lever 36 is pivotably retained adjacent its rearward end to the cassette holder 35 at 35a. Accordingly, in association with the clockwise rotation of the positioning lever, the cassette holder 35 is bodily lowered, being guided by a guiding pin 35b, rigidly fixed to the lower part of the cassette holder 35 and also projecting through a vertically extending slot 1k in the chassis 1.

An actuator arm 38 is pivotally disposed on a pivot 38a with the chassis and is normally urged to rotate in a clockwise direction by the force of a torsion spring 39. In addition, the actuator arm 38 is provided with a cassette contact plate 38b that is, when the cassette is not loaded, located at the rear end of the cassette holder 35. The actuator arm 38 also has a semi-circular recess 38c therein into which the positioning lever 36 fits a roller 36b attached thereto. Thus, as the actuator arm 38 is rotated in a counter-clockwise direction, the roller 36b rolls out of its recess along an arcuate surface 38d in the actuator arm. A push arm 40 is pivotally mounted on a pivot 40a retained to the actuator arm 38 and is normally urged to rotate in a counter-clockwise direction by the force of a torsion spring 41. A slide plate 42 is urged toward the right-hand direction in FIG. 5 by the action of a tension spring 43, and when the slide plate slides against the force of the spring to a predetermined position through a locking position, its sliding shift is being guided by its longitudinal slot 42 receiving therein a pin 11 rigidly fixed to the chassis 1, and consequently as additional guide member therefor a slide plate pin 42b slides in an elongated slot 1m in the chassis 1 in which the pin projects. The pin 42b is provided with an coaxial roller 42c around which the push arm 40, when it moves to the left, engage its front end cut-out portion 40b, and thereby actuates the slide plate 42 to move in the same direction against the force of the tension spring 43. The push arm 40 also has at its front end a slanting edge 40c which, during the final portion of the above mentioned push arm sliding shift in which the slide plate 42 reaches the predetermined position, abuts against a pin 1n rigidly fixed to the chassis 1 and rides up its periphery, lifting upward the forward end of the push arm 40, which consequently unlocks the roller 42c from the cut-out portion 40b. A hook lever 44 is provided mounted pivotably on a pivot 44a and is normally urged to rotate in a counter-clockwise direction by the force of a tension spring 45. In addition, the hook plate 44 is connected adjacent its upper portion to a cassette holding plunger 47 by means of a buffer rubber 46, and is provided with hook 44b which, when the slide plate 42 is moved to the locking position in the left-hand direction, is intended to engage an engaging pin 42d retained to the slide plate. The numeral 48 generally designates a first oil damper connected to a lower end portion 36c of the positioning lever 36 and adapted for functioning to damp cassette loading mechanical impacts. The numeral 49 generally indicates a second oil damper connected to the actuator arm 38 by means of a connecting rod 50 and adapted to damp cassette unloading mechanical impacts.

Operation of the tape player mechanism whose arrangement has been explained above will now be described in accordance with the present invention.

Playback operation:

Referring back to FIG. 1, as a solenoid of the plunger 2 is energized, the slide plate 4 is shifted to the left, moving the slide cam plate 6, which takes an initial position in FIG. 1, also to the left, i.e. to an operative position, through the engaging tongue 4d and the hole 6a. Since the cam surface 6d in the slide cam plate 6 is in contact with the roller 8c on the actuating plate 8, this leftward movement of the slide cam plate 6 brings the actuating plate 8 to move downward in the FIG. 1 against the force of the tension spring 9. Since, as previously described, the actuating plate is spring loaded against the head base 10 by the tension spring 11, the downward movement of the actuating plate 8 results in, by the action of the same spring 11, a likewise downward movement of the head base 10. The distance that the head base 10 moves is predetermined in such a manner that the head base 10, after moving over a certain distance, is brought to a halt at a playback position with the forward end of the head base 10 abutting against the stopper 34, at which point the head 10e integrally retained on the head base 10 advances and comes into proper contact with the tape face of the cassette C with the required force for normal playback operation. Despite of the obstructed movement of the head base 10, the actuating plate further moves, by the inertia action of the spring 11, to the position illustrated in FIG. 3 slightly advanced relative to the head base 10. This forward movement of the actuating plate 8 also affects the push arms 13 and 14 positioned on its both sides in such a manner as will be described. When the actuating plate is moved downwardly (or forwardly), the force is applied to the push levers 13 and 14 so as to actuate the pinch rollers 21 and 22, respectively, to move into contact with their respective capstans 23 and 24. In this action, however, the pinch roller 22 should be elastically pressed against the capstan 24 whereas, since the roller 17c on the pinch roller holder 17 is held stationary by the cam surface 6f of the cam plate 6, the pinch roller 21 is prevented from rotation in spite of the pressure from the push arm 13; thus the pinch roller 21 is maintained spaced apart from the capstan 23 permitting normal playback drive of the tape in the leftward direction as controlled by the pinch roller 22.

Figure 3:
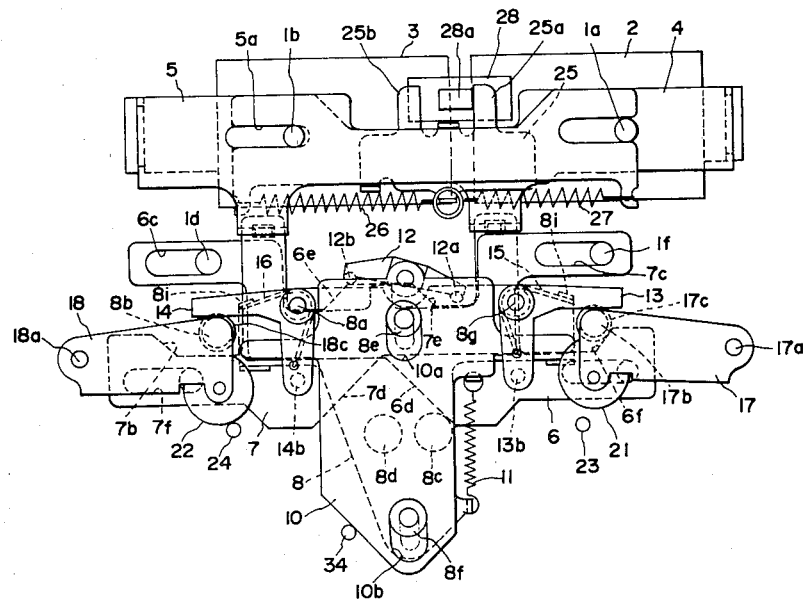
FIG. 3 is a schematic plan view of the tape player in a play-back position.
Figure 4:
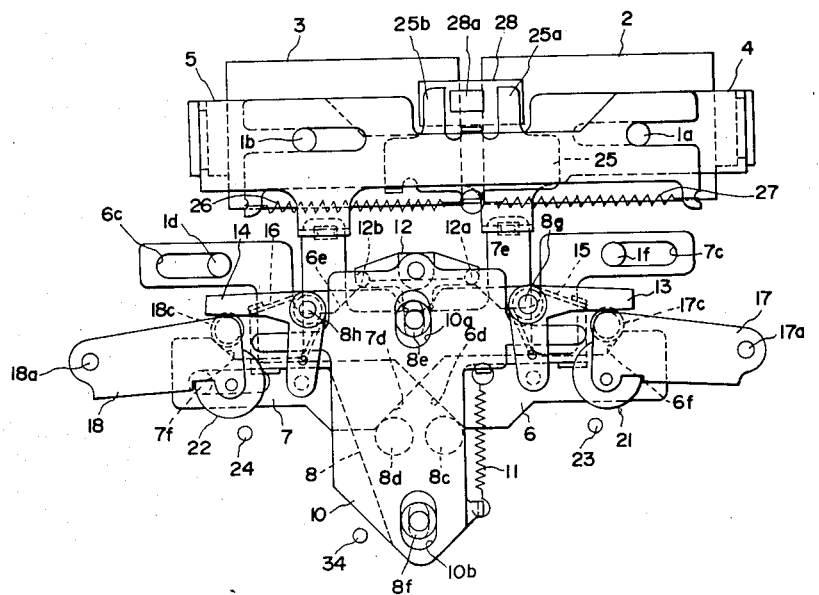
FIG. 4 is a schematic plan view of the tape player in the tape fast fowarding position which allows detection of blank areas between recorded musical performances.

Fast forward tape drive for detecting of blank tape area between recorded musical performances:

In the playback position of the tape player illustrated by FIG. 3, energization of the solenoid of the plunger 3 actuates the slide plate 5 to slide to the right, moving the slide cam plate 7 through the engaging tongue 5c engaged with the hole 7a. As shown in FIG. 4, by this sliding movement of the cam plate 7, the roller 18c of the pinch roller holder 18 is forced upward by the cam surface 7f in the same cam plate, causing the pinch roller holder 18 to rotate in a counter-clockwise direction against the spring-loaded force of the push arm 14. This results in a separation of the pinch roller 22 from the capstan 24, thus permitting fast winding of the tape by the reels (not shown) of the tape player.

Meanwhile, in the playback position of the tape player (FIG. 3), the swing arm 12 mounted on the head base 10 has its swing pin 12a maintained in the lowermost position, or not placed upon the cam surface 7e of the slide cam plate that is in non-actuating position, while having its other swing pin 12b landed on the cam surface 6e of the slide cam plate 6 that is in actuation position; that is, the swing arm being tilted to the right. With this position of the tape player, as the plunger 3 is actuated to move the slide cam plate 7 to the right, causing the cam surface 7e to force the swing pin 12a upward, which rotate the swing arm 12, with its opposite swing pin 12b maintained on the cam surface 6e of the cam plate 6. This counter-clockwise rotation of the swing arm serves to slightly retract the head base 10 and therefore the head 10e so that the head may be lightly contacted with the tape face permitting fast winding of the tape thus permitting detection of blank areas between recorded musical performances.

Switching-over operation:

When the tape player is switched over from the non-actuating position illustrated in FIG. 1 into the actuating position illustrated in FIG. 3, the resulting leftward sliding motion of the slide plate 4 increases the force of the tension spring 26 to such an extend that the switch plate 25 is caused to move to the left to balance the force of the tension spring 27. This leftward movement of the switch plate 25 brings its switch element 25a to press the contact element 28a of the contact block 28 to move to the left. Thus, the contact element 28a being set to the extreme left position as shown in FIG. 3 determined the playback condition for the tape player.

For fast forward drive of the tape, the slide plate 5 is moved to the right pulling the tension spring 27 to such an extent that the switch plate 25 can be shifted from the position illustrated in FIG. 3 to the position illustrated in FIG. 4 to balance force of the tension spring 26. The contact element 28a would be then maintained in a position slightly spaced apart from the switch element 25b, without being brought back centerly between the switch elements, i.e., the tape player non actuating position, due to a relatively great distance, as illustrated in FIG. 3, between the switch element 25b and the contact element 28a. This means, therefore, that despite the rightward movement of the switch plate 25 the switch plate 25 and contact element 28a are held away from each other and held substantially in the playback position similar to that represented by FIG. 3 wherein fast winding of the tape in the same direction with the playback position is performed, whereby blank areas between recorded musical performances are selectively detected.

It is to be noted that although the above description has referred only to the leftward drive of the tape for playback, blank area detecting, and changer-over operation, the structure of the preferred embodiment is so designed in its symmetrical construction to permit also the rightward tape drive for playback, blank area detecting, and change-over operation simply by reversing the aforesaid process, which is here omitted for the sake of brevity.

Referring to FIGS. 5-8, operation of the cassette loading and unloading will be described in accordance with the present invention.

Cassette loading:

Referring first to FIG. 5, insertion of a cassette C from the right into the cassette holder 35 first makes it abut against the contact plate 38b of the actuator arm 38. Further pressing on the cassette C brings the actuator arm 38 into counter-clockwise rotation against the torsion spring 39. This rotation of the actuator arm 38 causes the push arm 40 to move to the left (as best be illustrated in FIG. 7), which in turn moves the slide plate 42 also to the left against the force of the tension spring 43 with the cut-out portion 40b being locked with the pin 42b. When the slide plate 42 in its sliding motion reaches a point where its engaging pin 42d passes by the hook 44b of the hook plate 44, a solenoid of the cassette hold plunger 47 is energized, which cuases the hook plate 44 to rotate in a clockwise direction against the force of the tension spring 45; and thereby the hook 44b turns into the path along which the pin 42d is intended to advance or retract. Further advancement of the push arm 40 brings its front end oblique portion 40c into abutment against the stationary pin 1n and then rises up its peripheral surface, which causes the front end of the push arm 40 to tilt upward against the force of the torsion spring 41, unlocking the cut-out portion 40b from the roller 42b. Simultaneously, the slide plate 42 begins to spring back by the action of the tension spring 43 to the right, but is on its way to the original position blocked by the hook 44b, which engages the pin 42d; this hook 44b, as explaned earlier, has been rotated behind the pin just after the pin passed by in its forward movement. The impact of the hook being struck by the slide plate pin could be such that the hook plate 44 tends to rotate in a counter-clockwise direction and hence might cause the plunger 47 to be undesirably affected, in the absence of the buffer rubber 46 interposed between the hook plate 44 and the plunger 47. By virtue of this buffer rubber, such impact can be damped down and the plunger 47 is protected. Alternatively, such buffer rubber 46 may be coated on the contacting faces of the hook 44b and the engaging pin 42d.

In more detail, during the counter-clockwise rotation of the actuating arm 38 with the slide plate 42 being moved to the left, as previously referred to, the roller 36b of the positioning lever 36, leaving the semicircular recess 38c, rolls down along the arcuate surface 38d of the actuator arm 38. As long as the roller is on the arcuate surface 38d that is of the diametrical arc of a circle having its center at the pivot 38a, the positioning lever 36 does not complete the required turn for positioning the cassette. Substantially at the same moment the slide plate 42 is engaged, as mentioned above, the roller 36b of the positioning lever 36 is at the extremety of the arcuate surface 38d. Since the positioning lever 36 is biased in the clockwise direction by its torsion spring, as the roller 36b, running past the edge of the arcuate surface 38d, descends along the surface 38e of the actuator arm 38, the positioning lever 36 rotates, as best illustrated in FIG. 8. In association with this rotation of the positioning lever 36, the cassette holder 35 is lowered, completing the loading of the cassette C.

Cassette unloading:

As the cassette hold plunger 47 is switched into OFF position, the hook plate 44 is caused to rotate in a counter-clockwise direction by the action of the tension spring 45, unlocking the hook 44b from the engaging pin 42d. Where the tape player is in its cassette loading position, as shown in FIG. 8, the cut-out portion 40b of the push arm 40 is out of engagement with the roller 42c of the slide plate 42. Therefore, the release of the locking engagement of the hook 44b from the pin 42d actuates the slide plate 42 to spring back to the right due to the force of the tension spring 43.

In addition, when the slide plate 42 moves to the right, the pin 36c of the positioning lever 36 is pressed by a vertical center portion of the slide plate 42, which causes the positioning lever 36 to rotate in a counter-clockwise direction against the force of the torsion spring 37. The roller 36b of the positioning lever 36 then rises up along the straight surface 38e of the actuator arm 38, lifting the cassette holder 35. As soon as the roller 36b rides over the uppermost portion of the straight surface 38e, the actuating arm 38 is rotated in a clockwise direction by the action of the torsion spring 39, bringing the contact plate 38b back to its original position to eject out the cassette C to the right.

As mentioned earlier, the positioning lever 36 is connected to the first oil damper 48 through the pin 36c. By this arrangement, therefore, the sudden, sharp jolts caused by the movements of unit components such as the cassette positioning action of the cassette holder 35 or other rotational and sliding component movements can be effectively damped by the first oil damper 48. In addition, the second oil damper 49 is interconnected between the actuating arm 38 and the connecting rod 50 in a simmilar way so as to absorb the objectionable physical impacts due to component mechanical actions, e.g., the cassette unlaoding action of the cassette hold plunger, actuating arm 38 clockwise rotation, and the like.

As described above, the embodiment of this invention has many advantages, first the pointed element for detecting the tape type does not advance from its retracted position until a cassette is completely loaded for play so that the pointed element would not form obstruction to the loading of the cassette. Secondly, only when the head advanced to the cassette, the pointed element is moved to its cassette tape sensing position where it can sense directly on the cassette itself, therefore, electrical connection to the necessary electrical circuit can be insured without any error.

What is claimed is:

1. A cassette tape player comprising:
   a chassis;
   a head base adapted to take a retracted position and an advanced position relative to a loaded cassette;
   probe means for detecting a chrome tape indicating aperture formed in said loaded cassette, said probe means being normally urged into engagement with said aperture;
   control means coupling said head base and said probe means for holding said probe means out of engagement with said aperture while said head base takes the retracted position; and switch means for turning on an electric circuit for a chrome tape by the probe means being urged into engagement with the chrome tape indicating aperture.

2. A cassette tape player according to claim 1, wherein said probe means includes a selector lever pivotally provided within the chassis and having at its one end a bent probe portion; and a tension spring provided between the chassis and the lever to urge the bent probe portion into said engagement with the aperture.

3. A cassette tape player according to claim 1, wherein said head base is moved by an actuating plate between the retracted position and the advanced position.

4. A cassette tape player according to claim 3, wherein said control means includes an interlocking bar normally urged toward and abutted against said actuating plate at its one end and having a bent portion at its other end to engage the selector lever.

* * * * *